US007001862B2

(12) United States Patent
Moman et al.

(10) Patent No.: US 7,001,862 B2
(45) Date of Patent: Feb. 21, 2006

(54) CATALYST COMPOSITION FOR POLYMERIZATION OF OLEFINS AND METHOD FOR PREPARING THE SAME

(75) Inventors: Akhlaq A. Moman, Riyadh (SA); Khalid Al-Bahily, Riyadh (SA); Atieh Abu-Raqabah, Riyadh (SA); John Ledford, Riyadh (SA); Orass M. Hamed, Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

(21) Appl. No.: 10/470,465

(22) PCT Filed: Jan. 30, 2002

(86) PCT No.: PCT/EP02/00931

§ 371 (c)(1),
(2), (4) Date: Jan. 8, 2004

(87) PCT Pub. No.: WO02/064646

PCT Pub. Date: Aug. 22, 2002

(65) Prior Publication Data

US 2004/0106513 A1    Jun. 3, 2004

(30) Foreign Application Priority Data

Feb. 7, 2001    (EP) .................... 01102731

(51) Int. Cl.
B01J 31/00 (2006.01)
B01J 37/00 (2006.01)
C08F 4/60 (2006.01)
C08F 4/02 (2006.01)

(52) U.S. Cl. .......... 502/103; 502/159; 502/114; 502/115; 502/118; 502/125

(58) Field of Classification Search .......... 502/103, 502/104, 115, 129, 132, 159, 114, 118, 125
See application file for complete search history.

(56) References Cited

U.S. PATENT DOCUMENTS

| 4,508,842 | A |   | 4/1985  | Beran |
| 4,900,706 | A | * | 2/1990  | Sasaki et al. ............... 502/116 |
| 5,118,648 | A |   | 6/1992  | Furtek |
| 5,189,000 | A | * | 2/1993  | Masi et al. ................. 502/113 |
| 5,198,399 | A | * | 3/1993  | Hoff et al. .................. 502/111 |
| 5,298,579 | A |   | 3/1994  | Hoff |
| 5,362,824 | A | * | 11/1994 | Furtek et al. ............... 526/114 |
| 5,420,313 | A | * | 5/1995  | Cunnington et al. ........ 549/529 |
| 5,534,472 | A |   | 7/1996  | Winslow |
| 5,661,095 | A |   | 8/1997  | Meverden |
| 5,670,439 | A |   | 9/1997  | Winslow |
| 5,739,224 | A | * | 4/1998  | Luciani et al. ........... 526/124.5 |
| 5,744,414 | A | * | 4/1998  | Jenny ........................ 502/103 |
| 5,916,982 | A | * | 6/1999  | Nakazawa et al. ............ 526/97 |
| 5,942,586 | A | * | 8/1999  | Herrmann et al. .......... 526/160 |
| 6,221,802 | B1 | * | 4/2001  | Costa et al. ................. 502/109 |
| 6,262,196 | B1 | * | 7/2001  | Mecking ..................... 526/114 |
| 6,288,182 | B1 | * | 9/2001  | Hamed et al. ........... 526/124.3 |
| 6,391,989 | B1 | * | 5/2002  | Bohnen et al. ............. 526/134 |
| 6,403,520 | B1 | * | 6/2002  | Hamed et al. ............. 502/113 |
| 6,417,130 | B1 | * | 7/2002  | Mink et al. ................. 502/113 |
| 6,538,078 | B1 | * | 3/2003  | Luo et al. ................ 526/124.3 |
| 6,617,277 | B1 | * | 9/2003  | Hamed et al. ............. 502/104 |
| 6,713,425 | B1 | * | 3/2004  | Mink et al. ................. 502/113 |
| 6,784,263 | B1 | * | 8/2004  | Hamed et al. ............. 526/114 |
| 6,800,581 | B1 | * | 10/2004 | Ledford et al. ............. 502/103 |

FOREIGN PATENT DOCUMENTS

| GB | 2 028 347 A  | 3/1980 |
| WO | WO 96 30122 A | 10/1996 |
| WO | WO 00 23480 A | 4/2000 |

* cited by examiner

*Primary Examiner*—Anthony Green
*Assistant Examiner*—Jennine Brown
(74) *Attorney, Agent, or Firm*—Kramer Levin Naftalis & Frankel LLP

(57) ABSTRACT

The present invention relates to a catalyst composition for polymerization of olefins comprising: (a) a solid catalyst precursor comprising at least one vanadium compound, at least one magnesium compound and a polymeric material or a solid catalyst precursor comprising at least one vanadium compound, at least one further transition metal compound and/or at least one alcohol, at least one magnesium compound and a polymeric material; and (b) a cocatalyst comprising at least one aluminum compound; and to a method for preparing a catalyst composition according to the present invention, comprising the steps of: (a) combining the components of the solid catalyst precursor; and (b) activating the catalyst precursor with aluminum compound.

20 Claims, No Drawings

CATALYST COMPOSITION FOR POLYMERIZATION OF OLEFINS AND METHOD FOR PREPARING THE SAME

FIELD OF THE INVENTION

This invention relates to catalyst compositions for polymerization of olefins and methods of preparing such catalyst compositions.

DESCRIPTION OF THE PRIOR ART

Several publications are referenced in this application. These references describe the state of the art to which this invention pertains, and are incorporated herein by reference.

The application of vanadium based Ziegler-Natta catalysts for industrial use has been limited to vanadium trichloride and vanadium oxytrichloride as homogenous catalysts in solution polymerization for the production of ethylene-propylene copolymers. To attain suitable activity for polymerization these catalysts require the use of halogenated organic molecules such as chloroform and trichlorofluoromethane as a promoter. In the absence of the promoter the catalyst activity is low. Further, the kinetic behavior of these catalysts during polymerization display high initial rates of polymerization followed by a sharp decrease with time, decay type rate-time kinetics, and as result produce resin of poor morphology.

The application of vanadium based catalysts for ethylene polymerization, high density and linear low density polyethylene production, has been comparatively very limited. Attempts have been made to support vanadium based catalysts on silica or magnesium chloride to produce catalysts for ethylene polymerization. U.S. Pat. No. 4,508,842 describes a catalyst preparation in which a complex of $VCl_3$ and tetrahyrofuran (THF) is treated with silica, the solvent is then removed from the solid by distillation and a boron trihalide or alkylaluminum halide modifier is added to the solid. In addition, chloroform is used as a promoter with the catalyst for ethylene polymerization. However, the productivity and stability of this catalyst system is relatively poor.

U.S. Pat. Nos. 5,534,472 and 5,670,439 describe a silica supported vanadium catalyst prepared by the prior contacting of silica with an organomagnesium compound and a trialkylaluminum compound. The catalysts are suitable for the production of ethylene-hexene copolymer. However, the polymerizations are conducted with trichlorofluoromethane or dibromomethane promoters.

Further, procedures typically used for the preparation of suitable magnesium chloride and silica supports such as spray drying or re-crystallization processes are complicated and expensive. Also, the inorganic supports remain in the product, which can affect the product properties, such as optical properties, or processing.

It is an object of the present invention to provide a catalyst composition which overcomes the drawbacks of the prior art, especially providing a catalyst composition which is cheap in preparation and which exhibits an enhanced productivity, stability and activity without using halogenated organic molecules as a promoter. Moreover, it is a further object to provide a method for preparing such a catalyst composition.

SUMMARY OF THE INVENTION

The present invention provides a catalyst composition for polymerization of olefins comprising: (a) a solid catalyst precursor comprising at least one vanadium compound, at least one magnesium compound and a polymeric material; and (b) a cocatalyst comprising at least one aluminum compound for activating the catalyst precursor.

Most preferably, the component (a) further comprises at least one further transition metal compound and/or at least one alcohol.

The polymer particles used in catalyst preparation have a mean particle diameter of about 5 to 1 000 microns and a pore volume of at least about 0.05 cm$^3$/g and a pore diameter of about 20 to 10 000 angstroms, preferably from about 500 to 10 000 angstroms, and a surface area of about 0.1 m$^2$/g to 100 m$^2$/g, preferably from about 0.2 m$^2$/g to 30 m$^2$/g.

The catalyst composition of the present invention may be used for polymerization of olefins, such as ethylene forming polyethylene homopolymer, and ethylene with higher olefins forming copolymers.

DETAILED DESCRIPTION OF THE INVENTION

The solid catalyst precursor used in the present invention comprises preferably at least one vanadium compound, at least one transition metal compound and/or at least one alcohol, at least one magnesium compound and a polymeric material having a mean particle diameter of about 5 to 1 000 microns and a pore volume of at least about 0.05 cm$^3$/g and a pore diameter of about 20 to 10 000 angstroms, preferably from about 500 to 10 000 angstroms, and a surface area of about 0.1 m$^2$/g to 100 m$^2$/g, preferably from about 0.2 m$^2$/g to 30 m$^2$/g.

The vanadium compound used for the synthesis of the solid catalyst precursor in the present invention is represented by the general formulas $V(OR^1)_nX_{4-n}$, $V(R^2)_nX_{4-n}$, $VX_3$ and $VOX_3$, wherein $R^1$ and $R^2$ represent an alkyl group, aryl group or cycloalkyl group having 1 to 20 carbon atoms, X represents a halogen and n represents a number satisfying $0 \leq n \leq 4$. Examples of $R^1$ and $R^2$ include alkyl groups such as methyl, ethyl, n-propyl, isopropyl, n-butyl, isobutyl, tert-butyl and the like Preferred examples of the above mentioned vanadium compounds are selected from the group comprising vanadium tetraethoxide, vanadium tetrapropoxide, vanadium tetrabutoxide, vanadium trichloride, vanadium tetrachloride, vanadium oxytrichloride, vanadium dichlorodiethoxide and/or the like. Vanadium tetrachloride and/or vanadium oxytrichloride are most preferred.

The transition metal compound which may be used for the synthesis of the solid catalyst precursor in the present invention is represented by the general formulas $Tm(OR^3)_nX_{4-n}$, $TmOX_3$ and $Tm(R^4)_nX_{4-n}$, wherein Tm represents a transition metal of Group IVB, VB, or VIB, wherein $R^3$ and $R^4$ represent an alkyl group, aryl group or cycloalkyl group having 1 to 20 carbon atoms, X represents a halogen atom and n represents a number satisfying $0 \leq n \leq 4$. Non-limiting examples of the transition metal are titanium and vanadium, examples of $R^3$ and $R^4$ include alkyl groups such as methyl, ethyl, n-propyl, isopropyl, n-butyl, isobutyl, tert-butyl and the like.

Preferred examples of the above mentioned transition metal compounds are selected from the group comprising titanium trichloromethoxide, titanium dichlorodimethoxide, titanium tetramethoxide, titanium trichloroethoxide, titanium dichlorodiethoxide, titanium tetraethoxide, titanium trichloropropoxide, titanium dichlorodipropoxide, titanium chlorotripropoxide, titanium tetrapropoxide, titanium trichlorobutoxide, titanium dichlorodibutoxide, titanium tetrabutoxide, vanadium tetrachloride, vanadium tetraethoxide, vanadium tetrapropoxide, vanadium tetrabutoxide, vanadium oxytrichloride, vanadium dichlorodiethoxide and/or the like. Titanium tetraethoxide, titanium tetrapropoxide and/or titanium tetrabutoxide are most preferred.

The alcohol compound which may be used for the synthesis of the solid catalyst precursor in the present invention includes compounds represented by the general formula $R^5OH$, wherein $R^5$ is an alkyl group, aryl group or cycloalkyl group having 1 to 20 carbon atoms. Examples of $R^5$ include groups such as methyl, ethyl, n-propyl, isopropyl, n-butyl, isobutyl, tert-butyl, cyclohexyl, phenyl, methylphenyl, ethylphenyl and the like.

Preferred examples of the above mentioned alcohols are selected from the group comprising methanol, ethanol, n-propanol, isopropanol, n-butanol, isobutanol, tert-butanol, cyclohexanol, phenol, methylphenol, ethylphenol and/or the like.

The magnesium compound used for the synthesis of the solid catalyst precursor in the present invention include Grignard compounds represented by the general formula $R^6MgX$, wherein $R^6$ is a hydrocarbon group having 1 to 20 carbon atoms and X is a halogen atom, preferably chlorine. Other preferred magnesium compounds are represented by the general formula $R^7R^8Mg$, wherein $R^7$ and $R^8$ are each a hydrocarbon group having 1 to 20 carbon atoms.

Preferred examples of the above mentioned magnesium compounds are selected from the group comprising dialkylmagnesium such as diethylmagnesium, di-n-propylmagnesium, di-isopropylmagnesium, di-nbutylmagnesium, di-isobutylmagnesium butylethylmagnesium, dihexylmagnesium, dioctylmagnesium, butyloctylmagnesium; alkylmagnesium chloride such as ethylmagnesium chloride, butylmagnesium chloride, hexylmagnesium chloride and/or mixtures thereof.

The polymer particles used for the synthesis of the solid catalyst precursor in the present invention have a spherical shape with a mean particle diameter of about 5 to 1 000 microns and a pore volume of at least about 0.05 cm$^3$/g and a pore diameter of about 20 to 10 000 angstroms, preferably from about 500 to 10 000 angstroms, and a surface area of about 0.1 m$^2$/g to 100 m$^2$/g, preferably from about 0.2 m$^2$/g to 30 m$^2$/g.

Examples of the above polymeric supports used in the catalyst preparation of the present invention are selected from the group comprising polymer particles of polyvinylchloride, polyvinylalcohol, polyketone, hydrolyzed polyketone, ethylene-vinylalcohol copolymer, polycarbonate and the like. Among these polymeric materials polyvinylchloride is more preferred and non-crosslinked polyvinylchloride particles are most preferred. Polyvinylchloride having a molecular weight in the range of about 5 000 to 500 000 g/mole is most preferred.

The use of the polymer particles mentioned in the present invention, in catalyst preparation offers significant advantages over traditional olefin polymerization catalysts using supports such as silica or magnesium chloride. In comparison to the silica supported catalyst, the polymer particles described in catalyst preparation of the present invention do not require high temperature and prolonged dehydration steps prior to their use in catalyst synthesis, thereby simplifying the synthesis process and thus reducing the overall cost of catalyst preparation. Further the cost of the polymeric support used in the present invention is substantially cheaper than silica or magnesium chloride supports. In addition, the catalyst of the present invention uses significantly lower levels of catalyst components for catalyst preparation than silica or magnesium chloride supported catalysts. Also, the catalyst in the present invention is more active than conventional silica or magnesium chloride supported catalysts.

According to one embodiment of the present invention, a polyvinylchloride support is used. The synthesis of the solid catalyst precursor of the present invention involves introducing the polymeric material described above into a vessel and then adding: a diluent. Suitable diluents include isopentane, hexane, cyclohexane, heptane, isooctane and pentamethylheptane. The polymeric material is then treated with a magnesium compound described above at a temperature in the range of about 10° C. to 130° C. The ratio of magnesium compound to the polymer support may be in the range of about 0.05 mmol to 20 mmol per gram polymer, preferably 0.1 to 10 mmol per gram polymer. The solvent is then vaporized using a nitrogen purge at a temperature in the range of about 20° C. to 100° C.

The resulting free-flowing solid product is then slurried. Suitable solvents for slurring include isopentane, hexane, cyclohexane, heptane, isooctane and pentamethylheptane. The magnesium modified polymeric material is then treated with a transition metal compound and/or an alcohol described above at a temperature in the range of about 10° C. to 130° C. According to the present invention titanium tetramethoxide, titanium tetraethoxide, titanium tetrapropoxide, titanium tetrabutoxide are preferred transition metal compounds and methanol, ethanol, n-propanol, isopropanol, n-butanol are preferred alcohols. The resulting material is then treated with a vanadium compound described above at a temperature in the range of about 10° C. to 130° C. According to the present invention vanadium tetrachloride and/or vanadium oxytrichloride are preferred vanadium compounds.

The produced solid catalyst precursor is then washed several times with a suitable solvent such as isopentane, hexane, cyclohexane, heptane, and isooctane. The solid catalyst precursor is then dried using a nitrogen purge at a temperature in the range of 20° C. to 100° C. In the final dried solid catalyst precursor, the molar ratio of vanadium to magnesium is in the range of about 0.01 to 50. In the case where the transition metal compound is used in catalyst preparation the molar ratio of vanadium to transition metal in the catalyst precursor is in the range of about 0.01 to 50, and in the case where alcohol is used in catalyst preparation the molar ratio of vanadium to OH groups in the catalyst precursor is in the range of about 0.01 to 50.

The catalyst compositions of the present invention are not subjected to halogenation treatments, for example chlorination treatments. The thus-formed catalyst precursor of the present invention is suitably activated by aluminum compounds, also known as cocatalysts, and unlike catalyst compositions described in the prior art the catalyst compositions of the present invention do not require promoters such as chloroform, trichlorofluoromethane or dibromomethane during polymerization.

The aluminum compounds, also known as cocatalyst, used in the present invention are represented by the general formula $R^9{}_nAlX_{3-n}$, wherein $R^9$ represents a hydrocarbon group having 1 to 10 carbon atoms; X represents a halogen and n represents. a number satisfying $0 \leq n \leq 3$. Illustrative but not limiting examples include trialkylaluminums such as trimethylaluminum, triethylaluminum, tri-isobutylaluminum or tri-n-hexylaluminum; dialkylaluminum chloride such as dimethylaluminum chloride, diethylaluminum chloride. The preferred activators of the above general formula are trimethylaluminum, triethylaluminum, tri-isobutylaluminum and tri-n-hexylaluminum.

Examples of other suitable aluminum compounds of the present invention are represented by the general formula $R^{10}R^{11}Al$—O—$AlR^{12}R^{13}$, wherein $R^{10}$, $R^{11}$, $R^{12}$ and $R^{13}$ are either different linear, branched or cyclic alkyl group having 1 to 12 carbons, such as methyl, ethyl, propyl or isobutyl. The preferred examples are methylaluminoxane (MAO) and modified methylaluminoxane (MMAO). Further, mixtures of alkylaluminum compounds and aluminoxane compounds described above can also be conveniently used in the present invention.

The cocatalyst in the present invention can be used in an amount of about 10 to 5 000 in terms moles of aluminum in the cocatalyst to moles of transition metal in the catalyst precursor, and is preferably in the range of 20 to 3 000.

According to another object of the present invention there is provided a method for preparing a catalyst composition according to the present invention, comprising the steps of:

(i) combining the components of the solid catalyst precursor; and (ii) activating the catalyst precursor with aluminum compound.

The catalyst precursor may be activated with the aluminum compound in part or in whole prior to or during polymerization.

EXAMPLES

The following examples are intended to be illustrative of this invention. They are, of course, not be taken in any way limiting on the scope of this invention. Numerous changes and modifications can be made with respect to the invention.

Example 1

Synthesis of Solid Catalyst Precursor (A)

To a three-necked round bottom flask, equipped with a condenser and stirrer, was placed 10.0 g of polyvinylchloride spheres with an average particle size of 36 microns. The flask containing the polyvinylchloride was heated up to 70° C. using an oil bath and then evacuated at 30 mm Hg pressure for 30 minutes. The flask and its contents were then purged with dried nitrogen and the polyvinylchloride was slurried using 30 cm³ of isopentane. Then 1.5 cm³ of butylmagnesium chloride (2.0 molar in diethylether) was added to the slurry and the resultant mixture was stirred for 60 minutes at an oil bath temperature of 35° C., under reflux conditions. The isopentane was then evaporated to obtain a free-flowing powder by using a nitrogen purge at 35° C.

Then the magnesium-modified polyvinylchloride was slurried using 30 cm³ of isopentane and 8.0 cm³ of vanadium tetrachloride (1.0 molar in n-hexane) was added to the slurry and the resulting mixture was stirred at 35° C. for 20 minutes. The supernatant liquid was decanted and the resulting solid product was washed by stirring with 80 cm³ of isopentane and then removing the isopentane, then washed again twice with 80 cm³ of isopentane in each wash. Finally, the solid catalyst was dried using a nitrogen purge at 35° C. to yield a free-flowing brown colored solid product. The solid catalyst precursor was analyzed by atomic adsorption spectroscopy and was found to contain 0.59% by weight magnesium and 0.27% by weight vanadium.

Example 2

Ethylene Polymerization

An autoclave with a volume of 3 liters was purged with nitrogen at 130° C. for 30 minutes. After cooling the autoclave to 85° C. the reactor was purged with hydrogen and then 1.5 liters of n-hexane were introduced to the reactor. The reactor was then pressurized to 3 barg hydrogen pressure. Then 5.0 cm³ of tri-isobutylaluminum, TIBAL (1.0 molar in n-hexane) was injected into the reactor. Ethylene was introduced to the reactor such as to raise the reactor pressure to 15 barg. This was followed by injection of 0.1 g of the solid catalyst precursor "A" described in Example 1 after being slurried in 20 cm³ of n-hexane solvent. Polymerization was carried out for 1 hour; with ethylene supplied on demand to maintain the total reactor pressure at 15 barg. 110 grams of polyethylene were recovered with a resin bulk density of 0.240 g/cm³ and a catalyst productivity of 1100 gPE/g catalyst.

Example 3

Synthesis of Solid Catalyst Precursor (B)

To a three-necked round bottom flask, equipped with a condenser and stirrer, was placed 10.0 g of polyvinylchloride spheres with an average particle size of 36 microns. The flask containing the polyvinylchloride was heated up to 70° C. using an oil bath and then evacuated at 30 mm Hg pressure for 30 minutes. The flask and its contents Were then purged with dried nitrogen and the polyvinylchloride was slurried using 30 cm³ of isopentane. Then 1.5 cm³ of butylmagnesium chloride (2.0 molar in diethylether) was added to the slurry and the resultant mixture was stirred for 60 minutes at an oil bath temperature of 35° C., under reflux conditions. The isopentane was then evaporated to obtain a free-flowing powder by using a nitrogen purge at 35° C.

Then the magnesium-modified polyvinylchloride was slurried using 30 cm³ of isopentane and 2.0 cm³ of ethanol (1.0 molar in n-hexane) was added to the slurry and the resulting mixture was stirred at 35° C. for 40 minutes. Then 8.0 cm³ of vanadium tetrachloride (1.0 molar in n-hexane) was added to contents of the flask and the resulting mixture was stirred at 35° C. for 20 minutes. The supernatant liquid was decanted and the resulting solid product was washed by stirring with 80 cm³ of isopentane and then removing the isopentane, then washed again twice with 80 cm³ of isopenatne in each wash. Finally, the solid catalyst was dried using a nitrogen purge at 35° C. to yield a free-flowing brown colored solid product. The solid catalyst precursor was analyzed by atomic adsorption spectroscopy and was found to contain 0.78% by weight magnesium and 1.03% by weight vanadium.

Example 4

Ethylene Polymerization

An autoclave with a volume of 3 liters was purged with nitrogen at 130° C. for 30 minutes. After cooling the autoclave to 85° C. the reactor was purged with hydrogen and then 1.5 liters of n-hexane were introduced to the reactor. The reactor was then pressurized to 3 barg hydrogen pressure. Then 5.0 cm³ of tri-isobutylaluminum, TIBAL (1.0 molar in n-hexane) was injected³ into the reactor. Ethylene was introduced to the reactor such as to raise the reactor pressure to 15 barg. This was followed by injection of 0.1 g of the solid catalyst precursor "B" described in Example 3 after being slurried in 20 cm³ of n-hexane solvent. Polymerization was carried out for 1 hour; with ethylene supplied on demand to maintain the total reactor pressure at 15 barg. 150 grams of polyethylene were recovered with a resin bulk density of 0.243 g/cm³ and a catalyst productivity of 1500 gPE/g catalyst.

Example 5

Synthesis of Solid Catalyst Precursor (C)

To a three-necked round bottom flask, equipped with a condenser and stirrer, was placed 10.0 g of polyvinylchloride spheres with an average particle size of 36 microns. The flask containing the polyvinylchloride was heated up to 70° C. using an oil bath and then evacuated at 30 mm Hg pressure for 30 minutes. The flask and its contents were then purged with dried nitrogen and the polyvinylchloride was slurried using 30 cm³ of isopentane. Then 1.5 cm³ of butylmagnesium chloride (2.0 molar in diethylether) was added to the slurry and the resultant mixture was stirred for 60 minutes at an oil bath temperature of 35° C., under reflux conditions. The isopentane was then evaporated to obtain a free-flowing powder by using a nitrogen purge at 35° C.

Then the magnesium-modified polyvinylchloride was slurried using 30 cm³ of isopentane and 2.0 cm³ of titanium tetraethoxide (1.0 molar in n-hexane) was added to the slurry and the resulting mixture was stirred at 35° C. for 40 minutes. A dark green/brown colored solid was produced. Then 8.0 cm³ of vanadium tetrachloride (1.0 molar in n-hexane) was added to contents of the flask and the resulting mixture was stirred at 35° C. for 20 minutes. The supernatant liquid was decanted and the resulting solid product was washed by stirring with 80 cm³ of isopentane and then removing the isopentane, then washed again twice with 80 cm³ of isopenatne in each wash. Finally, the solid catalyst was dried using a nitrogen purge at 35° C. to yield a free-flowing brown colored solid product. The solid catalyst precursor was analyzed by atomic adsorption spectroscopy and was found to contain 0.57% by weight magnesium, 0.54% by weight titanium and 1.77% by weight vanadium.

Example 6

Ethylene Polymerization

An autoclave with a volume of 3 liters was purged with nitrogen at 130° C. for 30 minutes. After cooling the autoclave to 85° C. the reactor was purged with hydrogen and then 1.5 liters of n-hexane were introduced to the reactor. The reactor was then pressurized to 3 barg hydrogen pressure. Then 5.0 cm³ of tri-isobutylaluminum, TIBAL (1.0 molar in n-hexane) was injected into the reactor. Ethylene was introduced to the reactor such as to raise the reactor pressure to 15 barg. This was followed by injection of 0.1 g of the solid catalyst precursor "C" described in Example 5 after being slurried in 20 cm³ of n-hexane solvent. Polymerization was carried out for 1 hour; with ethylene supplied on demand to maintain the total reactor pressure at 15 barg. 390 grams of polyethylene were recovered with a resin bulk density of 0.290 g/cm³ and a catalyst productivity of 3900 gPE/g catalyst.

Examples 7–9

Ethylene Polymerization

An autoclave with a volume of 3 liters was purged with nitrogen at 130° C. for 30 minutes. After cooling the autoclave to 85° C. the reactor was purged with hydrogen and then 1.5 liters of n-hexane were introduced to the reactor. The reactor was then pressurized to 3 barg hydrogen pressure. Then the desired quantity of triethylaluminum, TEAL (1.0 molar in n-hexane), described in Table 1 below, was injected into the reactor. Ethylene was introduced to the reactor such as to raise the reactor pressure to 15 barg. This was followed by injection of 0.1 g of the solid catalyst precursor "C" described in Example 5 after being slurried in 20 cm³ of n-hexane solvent. Polymerization was carried out for 1 hour; with ethylene supplied on demand to maintain the total reactor pressure at 15 barg. Results are described in Table 1.

TABLE 1

Influence of TEAL Concentration

| Example | TEAL/ (mmol) | Yield/ (g PE) | Productivity/ (g PE/g catalyst) | Bulk Density/ (g/cm³) |
| --- | --- | --- | --- | --- |
| 7 | 2 | 340 | 3400 | 0.272 |
| 8 | 4 | 500 | 5000 | 0.310 |
| 9 | 6 | 455 | 4550 | 0.303 |

Example 10, 11

Ethylene Polymerization

An autoclave with a volume of 3 liters was purged with nitrogen at 130° C. for 30 minutes. After cooling the autoclave to 85° C. the reactor was purged with hydrogen and then 1.5 liters of n-hexane were introduced to the reactor. The reactor was then pressurized the desired hydrogen pressure, described in Table 2 below. Then 4.0 cm³ of triethylaluminum, TEAL (1.0 molar in n-hexane) was injected into the reactor. Ethylene was introduced to the reactor such as to raise the reactor pressure to 15 barg. This was followed by injection of 0.1 g of the solid catalyst precursor "C" described in Example 5 after being slurried in 20 cm³ of n-hexane solvent. Polymerization was carried out for 1 hour; with ethylene supplied on demand to maintain the total reactor pressure at 15 barg. Results are described in Table 2.

TABLE 2

Influence of Hydrogen Pressure

| Example | Hydrogen Pressure/ (barg) | Yield/ (g PE) | Productivity/ (g PE/g catalyst) | Bulk Density/ (g/cm³) |
| --- | --- | --- | --- | --- |
| 10 | 2 | 490 | 4900 | 0.290 |
| 8 | 3 | 500 | 5000 | 0.310 |
| 11 | 4 | 305 | 3050 | 0.260 |

Example 12

Ethylene-Butene Copolymerization

An autoclave with a volume of 3 liters was purged with nitrogen at 130° C. for 30 minutes. After cooling the autoclave to 85° C. the reactor was purged with hydrogen and then 1.5 liters of n-hexane were introduced to the reactor. Then the desired quantity of butene, described in Table 3 below, was added to the reactor. The reactor was then pressurized to 3 barg hydrogen pressure. Then 4.0 cm$^3$ of triethylaluminum, TEAL (1.0 molar in n-hexane). was injected into the reactor. Ethylene was introduced to the reactor such as to raise the reactor pressure to 15 barg. This was followed by injection of 0.1 g of the solid catalyst precursor "C" described in Example 5 after being slurried in 20 cm$^3$ of n-hexane solvent. Polymerization was carried out for 1 hour; with ethylene supplied on demand to maintain the total reactor pressure at 15 barg. Results are described in Table 3.

TABLE 3

Influence of Butene

| Example | Butene/ (cm$^3$) | Yield/ (g PE) | Productivity/ (g PE/g catalyst) | Bulk Density/ (g/cm$^3$) |
|---|---|---|---|---|
| 8 | 0 | 500 | 5000 | 0.310 |
| 12 | 10 | 502 | 5020 | 0.300 |

Example 13

Ethylene-Hexene Copolymerization

An autoclave with a volume of 3 liters was purged with nitrogen at 130° C. for 30 minutes. After cooling the autoclave to 85° C. the reactor was purged with hydrogen and then 1.5 liters of n-hexane were introduced to the reactor. Then the desired quantity of hexene, described in Table 4 below, was added to the reactor. The reactor was then pressurized to 3 barg hydrogen pressure. Then 4.0 cm$^3$ of triethylaluminum, TEAL (1.0 molar in n-hexane) was injected into to the reactor. Ethylene was introduced to the reactor such as to raise the reactor pressure to 15 barg. This was followed by injection of 0.1 g of the solid catalyst precursor "C" described in Example 5 after being slurried in 20 cm$^3$ of n-hexane solvent. Polymerization was carried out for 1 hour; with ethylene supplied on demand to maintain the total reactor pressure at 15 barg. Results are described in Table 4.

TABLE 4

Influence of Hexene

| Example | Hexene/ (cm$^3$) | Yield/ (g PE) | Productivity/ (g PE/g catalyst) | Bulk Density/ (g/cm$^3$) |
|---|---|---|---|---|
| 8 | 0 | 500 | 5000 | 0.310 |
| 13 | 10 | 476 | 4760 | 0.302 |

Example 14

Synthesis of Solid Catalyst Precursor (D)

To a three-necked round bottom flask, equipped with a condenser and stirrer, was placed 10.0 g of polyvinylchloride spheres with an average particle size of 36 microns. The flask containing the polyvinylchloride was heated up to 70° C. using an oil bath and then evacuated at 30 mm Hg pressure for 30 minutes. The flask and its contents were then purged with dried nitrogen and the polyvinylchloride was slurried using 30 cm$^3$ of isopentane. Then 1.5 cm$^3$ of butylmagnesium chloride (2.0 molar in diethylether) was added to the slurry and the resultant mixture was stirred for 60 minutes at an oil bath temperature of 35° C., under reflux conditions. The isopentane was then evaporated to obtain a free-flowing powder by using a nitrogen purge at 35° C.

Then the magnesium-modified polyvinylchloride was slurried using 30 cm$^3$ of isopentane and 2.0 cm$^3$ of titanium tetraethoxide (1.0 molar in n-hexane) was added to the slurry and the resulting mixture was stirred at 35° C. for 40 minutes. A dark green/brown colored solid was produced. Then 8.0 cm$^3$ of vanadium oxytrichloride (1.0 molar in n-hexane) was added to contents of the flask and the resulting mixture was stirred at 35° C. for 20 minutes. The supernatant liquid was decanted and the resulting solid product was washed by stirring with 80 cm$^3$ of isopentane and then removing the isopentane, then washed again twice with 80 cm$^3$ of isopenatne in each wash. Finally, the solid catalyst was dried using a nitrogen purge at 35° C. to yield a free-flowing brown colored solid product. The solid catalyst precursor was analyzed by atomic adsorption spectroscopy and was found to contain 0.74% by weight magnesium, 0.56% by weight titanium and 1.50% by weight vanadium.

Example 15

Ethylene Polymerization

An autoclave with a volume of 3 liters was purged with nitrogen at 130° C. for 30 minutes. After cooling the autoclave to 85° C. the reactor was purged with hydrogen and then 1.5 liters of n-hexane were introduced to the reactor. The reactor was then pressurized to 3 barg hydrogen pressure. Then 4.0 cm$^3$ of triethylaluminum, TEAL (1.0 molar in n-hexane) was injected into the reactor. Ethylene was introduced to the reactor such as to raise the reactor pressure to 15 barg. This was followed by injection of 0.1 g of the solid catalyst precursor "D" described in Example 14 after being slurried in 20 cm$^3$ of n-hexane solvent. Polymerization was carried out for 1 hour; with ethylene supplied on demand to maintain the total reactor pressure at 15 barg. 200 grams of polyethylene were recovered with a resin bulk density of 0.260 g/cm$^3$ and a catalyst productivity of 2000 gPE/g catalyst.

The features disclosed in the foregoing description and/or in the claims may, both separately and in any combination thereof, be material for realising the invention in diverse forms thereof.

The invention claimed is:

1. A catalyst composition for polymerization of olefins comprising:
   (a) a solid catalyst precursor consisting essentially of at least one vanadium compound represented by the general formulas $V(OR^1)_n X_{4-n}$, $V(R^2)_n X_{4-n}$, $VX_3$ and $VOX_3$ wherein $R^1$ and $R^2$ represent an alkyl group, aryl group or cycloalkyl group having 1 to 20 carbon atoms, X represents a halogen and n represents a number satisfying $0 \leq n \leq 4$, at least one further transition metal compound represented by the general formulas $Ti(OR^3)_n X_{4-n}$, $TiOX_3$ and $Ti(R^4)_n X_{4-n}$, wherein $R^3$ and $R^4$ represent an alkyl group, aryl group or cycloalkyl group having 1 to 20 carbon atoms, X represents a halogen atom and n represents a number satisfying $0 \leq n \leq 4$ and/or at least one alcohol, at least one Grignard compound represented by the general formula $R^6 MgX$ wherein $R^6$ is a hydrocarbon group having 1 to 20 carbon atoms and X is a halogen atom, and/or a dialkyl magnesium compound represented by the general formula $R^7R^8Mg$ wherein $R^7$ and $R^8$ are each a hydrocarbon group having 1 to 20 carbon atoms and a polymeric support consisting of polyvinylchloride, polyvinylalcohol, polyketone, hydrolyzed polyketone, ethylene-vinylalcohol copolymer or polycarbonate; and (b) a cocatalyst comprising at least one aluminum compound.

2. The catalyst composition according to claim 1, wherein the vanadium compound is selected from consisting of vanadium tetraethoxide, vanadium tetrapropoxide, vanadium tetrabutoxide, vanadium trichloride, vanadium tetrachloride, vanadium oxytrichloride, and vanadium dichlorodiethoxide.

3. The catalyst composition according to claim 1, wherein the transition metal compound is selected from consisting of titanium trichloromethoxide, titanium dichlorodimethoxide, titanium tetramethoxide, titanium trichloroethoxide, titanium dichlorodiethoxide, titanium tetraethoxide, titanium trichloropropoxide, titanium dichlorodipropoxide, titanium chlorotripropoxide, titanium tetrapropoxide, titanium trichlorobutoxide, titanium dichlorodibutoxide and titanium tetrabutoxide.

4. The catalyst composition according to claim 1, wherein the alcohol is represented by the general formula $R^5OH$, wherein $R^5$ is an alkyl group, aryl group or cycloalkyl group having 1 to 20 carbon atoms.

5. The catalyst composition according to claim 4, wherein the alcohol is selected from consisting of methanol, ethanol, n-propanol, isopropanol, n-butanol, isobutanol, tert-butanol, cyclohexanol, phenol, methylphenol, ethylphenol and/or mixtures thereof.

6. The catalyst composition according to claim 4, wherein the magnesium compound is diethylmagnesium, di-n-propylmagnesium, di-isopropylmagnesium, di-n-butylmagnesium, di-isobutylmagnesium butylethylmagnesium, dihexylmagnesium, dioctylmagnesium, butyloctylmagnesium, ethylmagnesium chloride, butylmagnesium chloride, hexylmagnesium chloride and/or mixtures thereof.

7. The catalyst composition according to claim 6, wherein the polymeric support is in the form of particles having a mean particle diameter of about 5 to 1000 microns, a pore volume of at least about 0.05 cm$^3$/g, a pore diameter of about 20 to 10000 angstroms and a surface area of about 0.1 m$^2$/g to 100 m$^2$/g.

8. The catalyst composition according to claim 7, wherein the pore diameter is from about 500 to 10000 angstroms and the surface area is from about 0.2 m$^2$/g to 30 m$^2$/g.

9. The catalyst composition according to claim 8, wherein the polymeric support is consists of polyvinylchloride having a molecular weight in the range of about 5000 to 500000 g/mole.

10. The catalyst composition according to claim 7, wherein the Grignard compound is used in the range of about 0.05 mmol to 20 mmol per gram of polymeric support.

11. The catalyst composition according to claim 7, wherein the molar ratio of vanadium to magnesium in the catalyst precursor is in the range of about 0.01 to 50.

12. The catalyst composition according to claim 7, wherein the molar ratio of vanadium to said transition metal compound in the catalyst precursor is in the range of about 0.01 to 50.

13. The catalyst composition according to claim 7, wherein the catalyst precursor includes an alcohol and the molar ratio of vanadium to OH groups in the catalyst precursor is in the range of about 0.01 to 50.

14. The catalyst composition according to claim 7, wherein the aluminum compound is represented by the general formula $R^9AlX_{3-n}$, wherein $R^9$ represents a hydrocarbon group having 1 to 10 carbon atoms, X represents a halogen and n represents a number satisfying $0 \leq n \leq 3$ and/or by the general formula $R^{10}R^{11}Al-O-AlR^{12}R^{13}$ wherein $R^{10}$, $R^{11}$, $R^{12}$ and $R^{13}$ are either the same or different linear, branched or cyclic alkyl group having 1 to 12 carbons, such as methyl, ethyl, propyl or isobutyl.

15. The catalyst composition according to claim 14, wherein the aluminum compound is trimethylaluminum, triethylaluminum, tri-isobutylaluminum, tri-n-hexylaluminum, methyl aluminoxane (MAO) or modified methyl aluminoxane (MMAO).

16. The catalyst composition according to claims 14, wherein the aluminum compound is a mixture of an alkylaluminum and an aluminoxane.

17. The catalyst composition according to claim 14, wherein the ratio of moles of aluminum in the cocatalyst to moles of transition metal in the catalyst precursor is about 10 to 5000.

18. The catalyst composition of claim 1, wherein the vanadium compound is vanadium tetrachloride and/or vanadium oxytrichloride and the transition metal compound is titanium tetraethoxide, titanium tetrapropoxide and/or titanium tetrabutoxide.

19. A method for preparing a catalyst composition comprising the steps of:

(a) forming a solid catalyst precursor by combining least one vanadium compound represented by the general formulas $V(OR^1)_nX_{4-n}$, $V(R^2)_nX_{4-n}$, $VX_3$ and $VOX_3$ wherein $R^1$ and $R^2$ represent an alkyl group, aryl group or cycloalkyl group having 1 to 20 carbon atoms, X represents a halogen and n represents a number satisfying $0 \leq n \leq 4$, at least one further transition metal compound represented by the general formulas $Ti(OR^3)_nX_{4-n}$, $TiOX_3$ and $Ti(R^4)_nX_{4-n}$, wherein $R^3$ and $R^4$ represent an alkyl group, aryl group or cycloalkyl group having 1 to 20 carbon atoms, X represents a halogen atom and n represents a number satisfying $0 \leq n \leq 4$ and/or at least one alcohol, at least one Grignard compound represented by the general formula $R^6MgX$ wherein $R^6$ is a hydrocarbon group having 1 to 20 carbon atoms and X is a halogen atom, and/or a dialkyl magnesium compound represented by the general formula $R^7R^8Mg$ wherein $R^7$ and $R^8$ are each a hydrocarbon group having 1 to 20 carbon atoms and a polymeric support consisting of polyvinylchloride, polyvinylalcohol, polyketone, hydrolyzed polyketone, ethylene-vinylalcohol copolymer, or polycarbonate; and (b) activating the catalyst precursor with aluminum compound.

20. The method according to claim 19, the catalyst precursor is activated with the aluminum compound in part or in whole during polymerization.

* * * * *